(12) United States Patent
Terabe et al.

(10) Patent No.: US 7,693,038 B2
(45) Date of Patent: Apr. 6, 2010

(54) OFDM RADIO COMMUNICATIONS SYSTEM, TRANSMITTER AND RECEIVER

(75) Inventors: Shigeo Terabe, Kawasaki (JP); Yutaka Asanuma, Tokyo (JP); Kengo Kurose, Hamura (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 701 days.

(21) Appl. No.: 11/515,291

(22) Filed: Sep. 1, 2006

(65) Prior Publication Data

US 2007/0223364 A1  Sep. 27, 2007

(30) Foreign Application Priority Data

Mar. 27, 2006  (JP)  ............................. 2006-085697

(51) Int. Cl.
*H04J 11/00* (2006.01)

(52) U.S. Cl. ...................................................... 370/208
(58) Field of Classification Search .................. 370/208
See application file for complete search history.

(56) References Cited

U.S. PATENT DOCUMENTS

2006/0034165 A1*  2/2006  Levy ........................... 370/208

* cited by examiner

*Primary Examiner*—Ayaz R Sheikh
*Assistant Examiner*—Nicholas Sloms
(74) *Attorney, Agent, or Firm*—Frishauf, Holtz, Goodman & Chick, P.C.

(57) ABSTRACT

Each of a general chunk to which pilot signals are allocated at a general density, and a high-density chunk to which pilot signals are allocated at a higher density than the density of the general chunk, is transmitted in a frequency band common to OFDM transmitters. Each of the OFDM transmitters allocates the high-density chunk to any one of OFDM receivers, which notifies poor receiving quality.

4 Claims, 8 Drawing Sheets

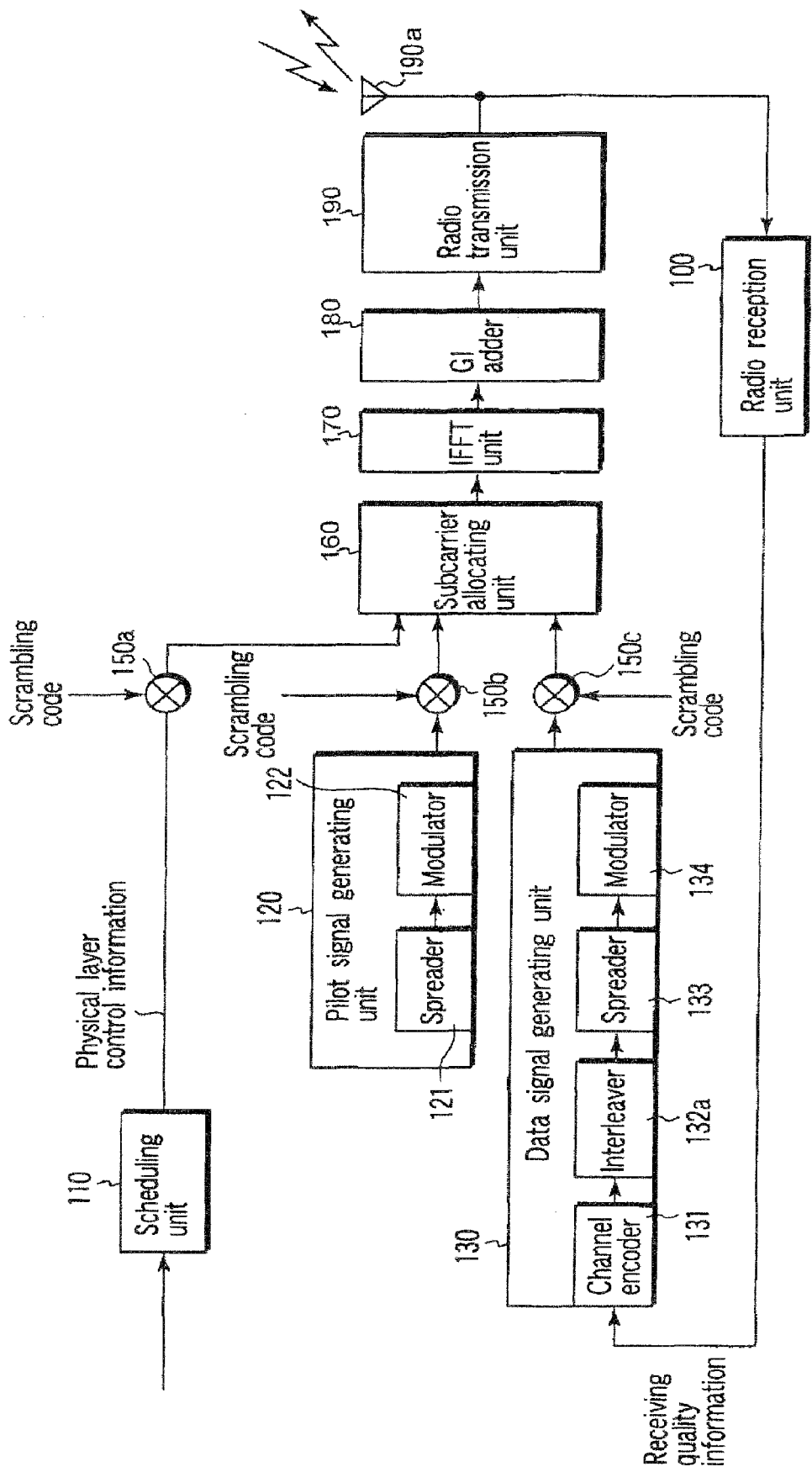
F I G. 2

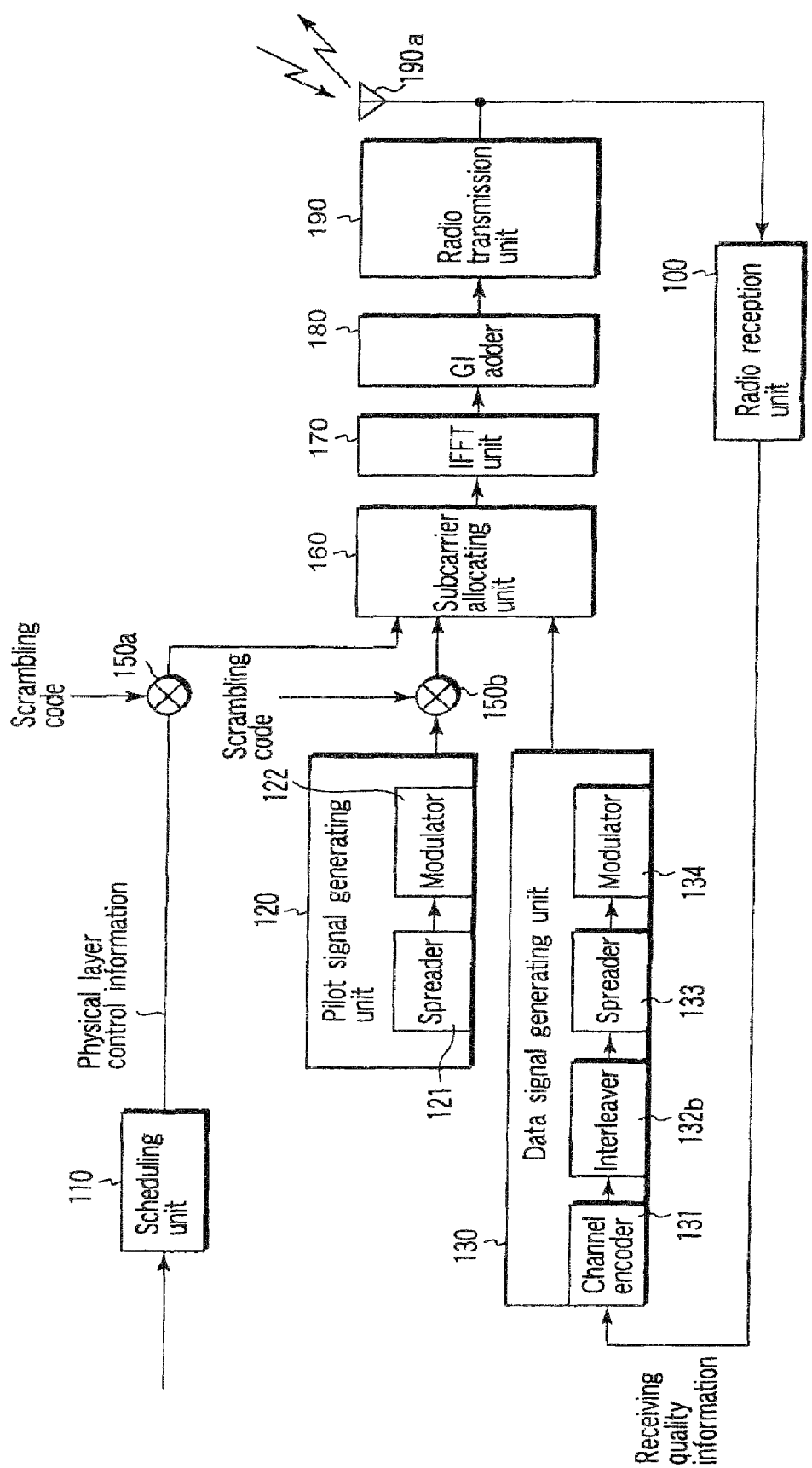
F I G. 5

OFDM RADIO COMMUNICATIONS SYSTEM, TRANSMITTER AND RECEIVER

CROSS-REFERENCE TO RELATED APPLICATIONS

This application is based upon and claims the benefit of priority from prior Japanese Patent Application No. 2006-085697, filed Mar. 27, 2006, the entire contents of which are incorporated herein by reference.

BACKGROUND OF THE INVENTION

1. Field of the Invention

This invention relates to an OFDM radio communications system employed in a mobile communications system such as a cellular telephone system.

2. Description of the Related Art

In the OFDM (Orthogonal Frequency Division Multiplexing) radio communications system, a plurality of transmitters use the same carrier frequency for the communications. It is considered to execute, in the transmitters, channel coding repetition of repeating the data symbol over a plurality of subcarriers and spreading code multiplication of spreading using the spread code over a plurality of subcarriers (refer to, for example, R1-060140 Orthogonal Pilot Channel Structure for Sectored Beams in E-UTRA Downlink, NTT DoCoMo, Fujitsu, Mitsubishi Electric, NEC, Sharp, [searched 20 Feb. 2006], Internet <URL: http://www.3gpp.org/ftp/tsg_ran/WG1_RL1/TSGR1_44/Docs/R1-060140.zip>). If this processing is executed in the transmitter, the receiver is able to receive signals at a high signal-to-noise ratio (SNR).

On the other hand, it is also considered to balance an interference signal component from a transmitter other than a desired transmitter and convert the interference signal component into white noise, in the receiver, in order to execute a stable reception. This is based on the matter that in a case where coding is executed, an error-correcting ability is improved and the receiving performance is enhanced by randomizing an error.

When the receiver executes such a signal reception, the signal is scrambled by a scrambling pattern peculiar to the transmitter or a data signal is interleaved by a pattern peculiar to the transmitter, in the transmitter. At this time, scrambling patterns or interleaving patterns in the transmitters are set to have a completely orthogonal or pseudo-orthogonal relationship with each other.

The interference signal component is made orthogonal or pseudo-orthogonal with a signal transmitted from a desired transmitter, and is thereby canceled or converted into white noise on the receiver side. In addition, since a pilot signal is often dispersed in a frequency direction, pilot orthogonality between the transmitters can also be implemented by frequency hopping of changing the frequency location for every transmitter.

The receiver employed in the above-described system needs to receive the OFDM signal at two stages. At the first stage, the pilot signal is balanced within a frequency-time symbol having a correlation with a channel response value, by taking advantage of the matter that the spreading codes or the scrambling patterns employed for the diffusion of the pilot signal in the transmitters have an orthogonal or pseudo-orthogonal relationship with each other. The interference signal component is thereby converted into white noise, and a channel response from the desired transmitter to the receiver is estimated. Furthermore, the data signal is also processed with the interleaving patterns or scrambling patterns to convert the interference signal component into white noise. At the second stage, channel equalization, i.e. equalization of compensating for the channel distortion which the data signal undergoes is executed by utilizing the channel response obtained at the first stage.

However, the location of the pilot signal in the frame employed in the conventional OFDM radio communications system has a problem that the receiver cannot sufficiently acquire the SN gain of the pilot signal. The pilot signal has a lower density than the data signal. Even if the transmitting power of the pilot signal is set to be greater than the transmitting power of the data signal, the pilot signal energy cannot be sufficiently acquired on the cell boundary. In addition, since the pilot signal is pseudo-orthogonal, the interference component cannot be completely canceled.

For this reason, even if the gain of the data signal is sufficiently acquired by the diffusion or scrambling, accuracy in the channel estimation value is insufficient and accuracy in the data reception is therefore deteriorated.

BRIEF SUMMARY OF THE INVENTION

The present invention has been accomplished to solve the above-described problems. The object of the present invention is to provide an OFDM radio communications system, a transmitter and a receiver, capable of enhancing the data reception accuracy by increasing the accuracy of the channel estimation.

To achieve this object, an aspect of the present invention is an OFDM radio communications system, comprising a plurality of transmitters that are housed in a controller and that transmit OFDM signals including as a chunk a plurality of subcarriers to which pilot signals and data signals are allocated, and a plurality of receivers receiving the OFDM signals in frequency bands designated by the transmitters. Each of the plurality of receivers comprises quality detecting means and transmission means. The quality detecting means detects receiving quality of the OFDM signals received from the transmitters. The transmission means transmits channel quality information indicating the receiving quality detected by the quality detecting means. Each of the plurality of transmitters comprises first reception means, determination means, rate detecting means, and rate information transmitting means. The first reception means receives the channel quality information from each of the plurality of receivers. The determination means determines which of a general chunk to which the pilot signals are allocated at a general rate and a high-density chunk to which the pilot signals are allocated at a higher rate than the rate of the general chunk, should be allocated to each of the plurality of receivers, in accordance with the channel quality information received by the first reception means. The rate detecting means obtains a rate of allocation of the general chunk and the high-density chunk, in accordance with the chunk allocation determined by the determination means. The rate information transmitting means transmits the rate obtained by the rate detecting means to the controller as rate information. The controller comprises reception means, band determining means, and transmission means. The reception means receives the rate information. The band determining means determines a general frequency band to which the general chunk is allocated and a high-density frequency band to which the high-density chunk is allocated, in accordance with the rate information received by the reception means. The transmission means transmits band information indicating the frequency bands determined by the band determining means to the plurality of transmitters. Each of the plurality of transmitters further comprises second reception means, allocation means, first transmission means, and second transmission means. The second reception means receives the band information. The allocation means allocates the general chunk to the general frequency band and the high-density chunk to the high-density frequency band, in accordance with the band information received by the second reception means. The first transmission means transmits control information indicating the frequency bands with which the OFDM signals are transmitted to the respective receivers, to the plurality of receivers, in accordance with the frequency bands allocated by the allocation means.

The second transmission means allocates the pilot signals and the data signals to the general chunk and the high-density chunk allocated by the allocation means, and transmitting the general chunk and the high-density chunk to the receivers. Each of the plurality of receivers further comprises first reception means and second reception means. The first reception means receives the control information.

The second reception means receives the chunk transmitted to the own receiver, in the frequency band based on the control information received by the first reception means.

In the present invention, as described above, the general chunk to which the pilot signals are allocated at a general rate, and the high-density chunk to which the pilot signals are allocated at a higher rate than the rate of the general chunk, are transmitted in the frequency band common to the plural transmitters. Each of the transmitters allocates the high-density chunk to the receiver notifying a poor receiving quality.

According to this aspect of the present invention, since the receiver having poor receiving quality can collect much pilot signal energy on the basis of the channel estimation, the SN gain of the transmission path estimation is improved. Thus, the accuracy of the channel estimation can be increased and the data reception accuracy can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing an OFDM transmitter in the OFDM radio communications system shown in FIG. 1;

FIG. 5 is a block diagram showing a configuration of a modified example of the OFDM transmitter shown in FIG. 1;

DETAILED DESCRIPTION OF THE INVENTION

An embodiment of the present invention will be explained below with reference to the accompanying drawings.

Figure 1:
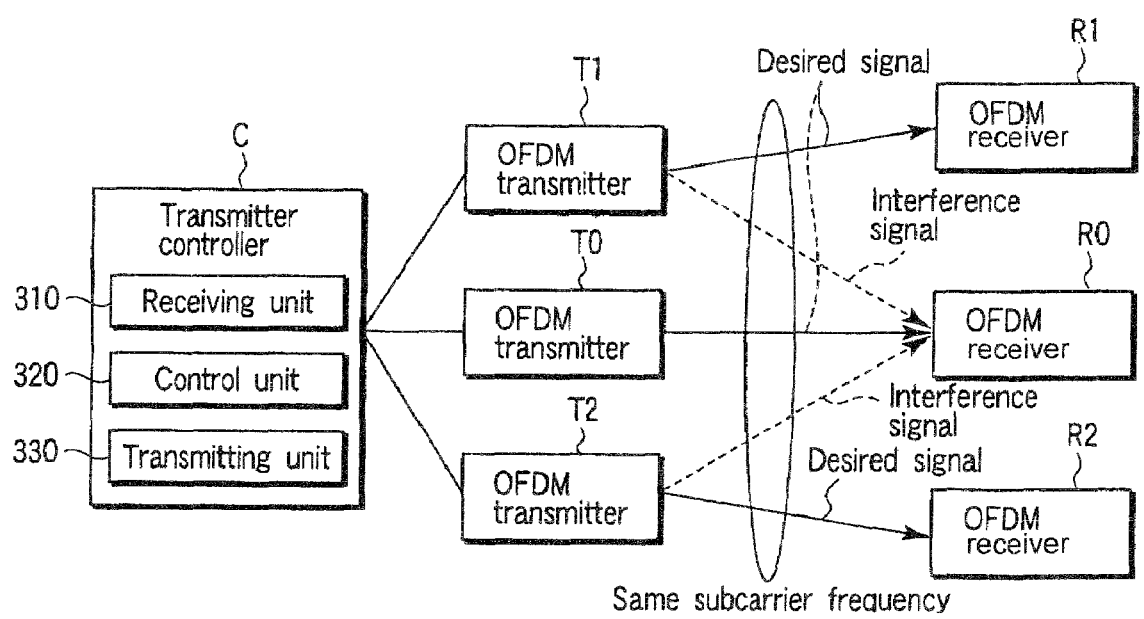
FIG. 1 is an illustration schematically showing a configuration of an OFDM radio communications system according to an embodiment of the present invention.

FIG. 1 schematically shows a configuration of an OFDM (Orthogonal Frequency Division Multiplexing) radio communications system according to an embodiment of the present invention. The OFDM radio communications system comprises a plurality of OFDM transmitters T0, T1, T2 and a plurality of OFDM receivers R0, R1, R2.

A transmitter controller C controls the OFDM transmitters T0, T1, T2. The transmitter controller C comprises a receiving unit 310 which receives signals from the OFDM transmitters T0, T1, T2 to obtain the data, a control unit 320 which generates control information on the basis of the data received by the receiving unit 310, and a transmitting unit 330 which transmits the control information generated by the control unit 320 to the OFDM transmitters T0, T1, T2.

One of the OFDM transmitters transmits the OFDM signal to at least one of OFDM receivers R0, R1, R2, with the same subcarrier frequency, at the same time. In FIG. 1, the OFDM transmitter T0 transmits the signal to the OFDM receiver R0, the OFDM transmitter T1 transmits the signal to the OFDM receiver R1, and the OFDM transmitter T2 transmits the signal to the OFDM receiver R2. In this case, for the OFDM receivers, the OFDM signal transmitted from the OFDM transmitters other than the desired OFDM transmitter becomes an interference signal and the receiving performance of the desired signal may be therefore deteriorated.

When the OFDM radio communications system is applied to the mobile communications system, a transmitting system of the base station corresponds to the OFDM transmitters T0, T1, T2, and a receiving system of a mobile station corresponds to the OFDM receivers R0, R1, R2. The OFDM transmitters T0, T1, T2 form cells adjacent to each other.

Next, the configuration of the OFDM transmitter according to the embodiment of the present invention is described with reference to FIG. 2. The OFDM transmitter shown in FIG. 2 corresponds to the OFDM transmitters T0, T1, T2 shown in FIG. 1. The following descriptions are focused on the OFDM transmitter T0 which transmits the signal to the OFDM receiver R0.

The OFDM transmitters T0, T1, T2 receive, from the respective OFDM receivers R0, R1, R2, information about the receiving quality and the interference signal intensity (hereinafter called channel quality information) of the frequency bands relating to transmission signals of the respective transmitters, and carry out the resource block allocation scheduling such that the system throughput becomes maximum.

As shown in FIG. 2, the OFDM transmitter T0 comprises a radio reception unit 100, a scheduling unit 110, a pilot signal generating unit 120, a data signal generating unit 130, a control signal generating unit 140, multipliers 150a, 150b, 150c, a subcarrier allocating unit 160, an IFFT unit 170, a GI adder 180, a radio transmission unit 190, and an antenna 190a.

The radio reception unit 100 receives channel quality information transmitted periodically from the OFDM receivers R0, R1, R2 and outputs the channel quality information to the scheduling unit 110.

On the basis of the channel quality information transmitted periodically from the OFDM receivers R0, R1, R2, the scheduling unit 110 allocates the resource blocks to the respective receivers and, on the basis of this allocation, gives the control information on the channel coding, spreading and modulation and the instructions on the resource allocation to a spreader 121, a channel encoder 131, a spreader 133, a modulator 134 and the subcarrier allocating unit 160.

As for the resource allocation to the subcarrier allocating unit 160, the scheduling unit 110 conducts chunk allocation in accordance with the channel quality information. The chunk is, for example, a group of subcarriers surrounded by thick lines shown in FIG. 3A and FIG. 3B or a minimum resource block allocated to the single OFDM receiver. One or more chunks are allocated to the single OFDM receiver.

Figure 3A:
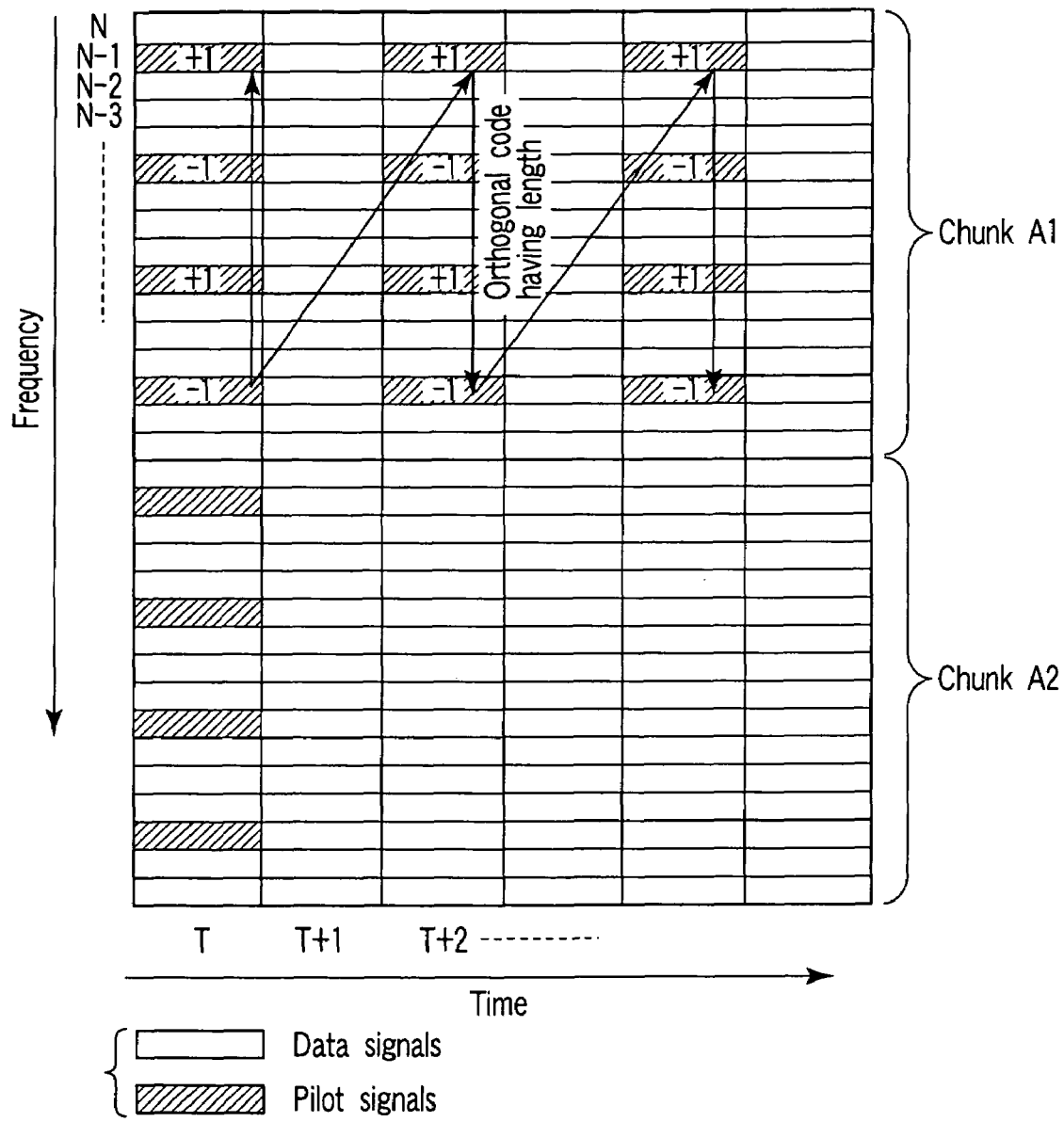
FIG. 3A is an illustration showing an arrangement of subcarriers employed in the OFDM radio communications system shown in FIG. 1.

More specifically, in accordance with the channel quality information, the scheduling unit 110 gives an instruction to the subcarrier allocating unit 160, to allocate to the OFDM receiver R0 the subcarriers corresponding to either a general chunk A2 to which the pilot signals are allocated at a general rate or a high-density chunk A1 to which the pilot signals are allocated at a higher rate than the general chunk as shown in FIG. 3A. This instruction is also given to the control signal generating unit 140.

Figure 3B:
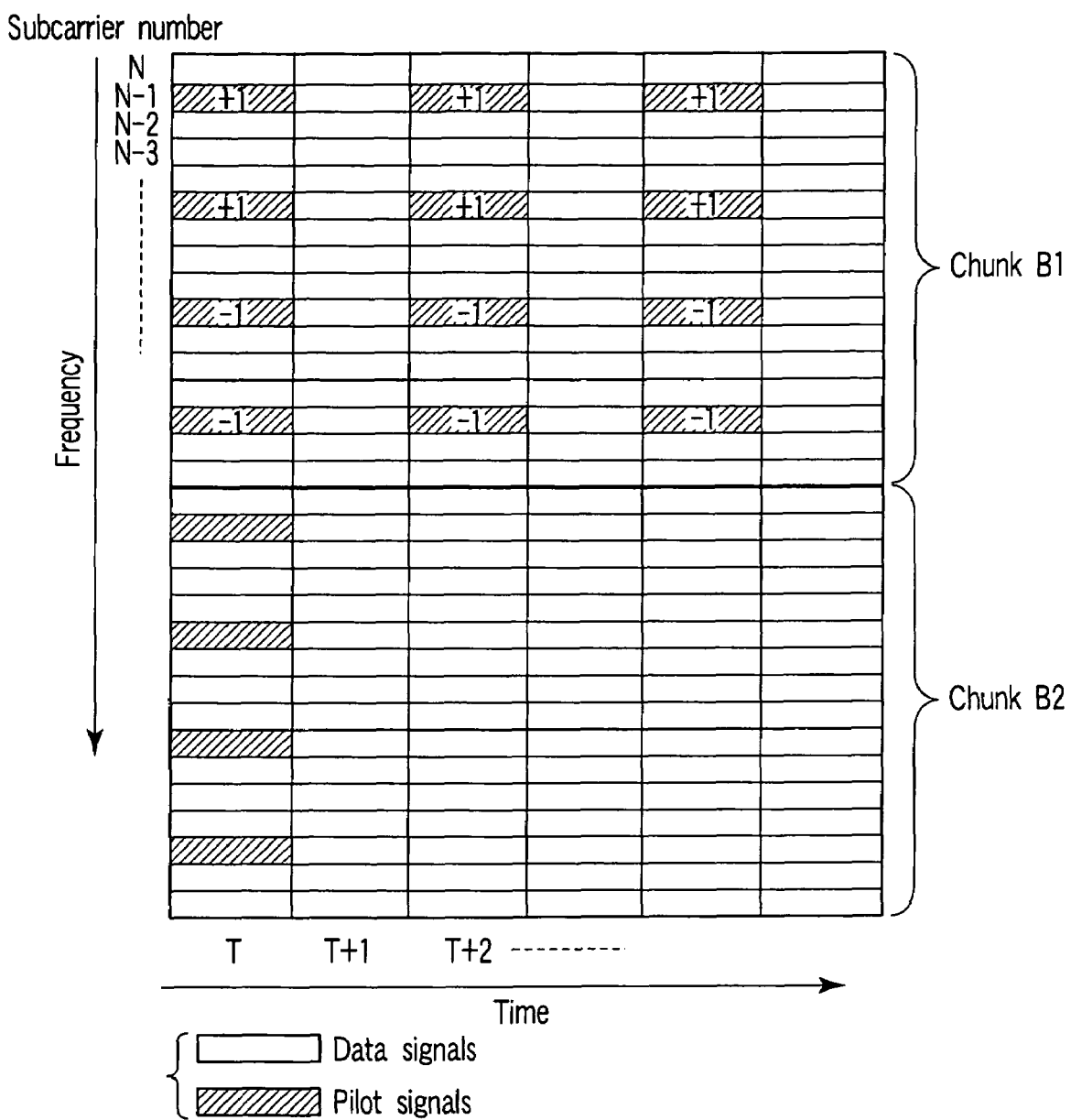
FIG. 3B is an illustration showing an arrangement of subcarriers employed in the OFDM radio communications system shown in FIG. 1.

In the other OFDM transmitters, the signals are allocated to subcarriers of a general chunk B2 in the same frequency band as the general chunk A2 or subcarriers of a high-density chunk B1 in the same frequency band as the high-density chunk A1 as shown in FIG. 3B. Thus, the frequency bands of the general chunk and the high-density chunk are common to a plurality of OFDM transmitters including the OFDM transmitter T0, by the chunk allocation conducted by the subcarrier allocating unit 160 in each of the OFDM transmitters.

The pilot signal generating unit 120 comprises the spreader 121 and a modulator 122. In the pilot signal generating unit 120, the spreader 121 spreads a predetermined bit string which is agreed in advance together with the OFDM transmitter T0 and which is the basis of the pilot signal, with a spreading code having the spreading factor of at least 1 as instructed by the scheduling unit 110, and the modulator 122 modulates the spreading result of the spreader 121 to generate a pilot signal represented as a complex number.

The spreading code used in the spreader 121 is one of codes between the frequencies having a correlation with the channel response value and in the time symbol. The spreading code maintains an orthogonal relationship between the other OFDM transmitter T1 and OFDM transmitter T2, and is designated by the scheduling unit 110.

In the examples shown in FIG. 3A and FIG. 3B, an orthogonal code having a length 12 is applied to the pilot signal. As the spreading code used here, a pseudo-orthogonal sequence may be used but a completely orthogonal sequence should desirably be used.

In this case, "orthogonality" means that the correlation value becomes zero while "pseudo-orthogonality" means that the absolute value of the correlation value becomes smaller than an auto-correlation value. In the following descriptions, the "orthogonality" and the "pseudo-orthogonality" are explained in detail.

An auto-correlation value of a certain sequence x [k] (k=1, . . . , K) is represented by formula (1) and a correlation value of two sequences x[k], y[k] (k=1, . . . , K) is represented by formula (2).

$$\sum_{k=1}^{K} x[k] \cdot x[k]^* \quad (1)$$

$$\sum_{k=1}^{K} x[k] \cdot y[k]^* \quad (2)$$

In a case where the sequence length is, for example, 4, four sequences $R_1$, $R_2$, $R_3$ and $R_4$ are mentioned below as examples of complex number sequences having an orthogonal relationship among one another.

$R_1$={+1, +1, +1, +1}
$R_2$={+1, +1, −1, −1}
$R_3$={+1, −1, −1, +1}
$R_4$={+1, −1, +1, −1}

In the four complex number sequences $R_1$, $R_2$, $R_3$ and $R_4$, all six correlation values are zero and orthogonal to one another. In general, if the sequence length is $2^k$, a maximum number $2^k$ of complex number sequences having an orthogonal relationship among one another can be generated. As another example, in four complex number sequences $R_1$, $R_2$, $R_3$ and $R_4$, all six correlation values are zero and orthogonal to one another.

$R_1$={+i, +i, +i, +i}
$R_2$={+i, +i, −i, −i}
$R_3$={+i, −i, −i, +i}
$R_4$={+i, −i, +i, −i}

On the other hand, six sequences $R_1$, $R_2$, $R_3$, $R_4$, $R_5$ and $R_6$ are mentioned below as examples of complex number sequences having a pseudo-orthogonal relationship.

$R_1$={+1, +1, +1, +1}
$R_2$={+1, +1, −1, −1}
$R_3$={+1, −1, −1, +1}
$R_4$={+1, −1, +1, −1}
$R_5$={+1, +1, +1, −1}
$R_6$={+1, −1, +1, +1}

In the six sequences $R_1$, $R_2$, $R_3$, $R_4$, $R_5$ and $R_6$ having a sequence length of 4, any auto-correlation value is 4 while the correlation value is 0 or 2. For example, each of six correlation values among $R_1$, $R_2$, $R_3$ and $R_4$ and the correlation value between $R_5$ and $R_6$ is zero while each of four correlation values between $R_1$, $R_2$, $R_3$ and $R_4$, and $R_5$ and $R_6$ is 2. Thus, more sequences than the sequences having an orthogonal relationship among one another, i.e. the sequences having the correlation values limited to zero can be generated by adding the sequences having a pseudo-orthogonal relationship, i.e. the sequences having the correlation values not limited to zero, to the complex number sequences.

The data signal generating unit 130 comprises a channel encoder 131, an interleaver 132a, a spreader 133 and a modulator 134. In the data signal generating unit 130, the channel encoder 131 executes encoding using, for example, Turbo codes, at a rate designated by the scheduling unit 110, for the bit string of the transmit data.

The interleaver 132a executes common interleaving to the OFDM transmitters T0, T1, T2 for the encoding result of the channel encoder 131.

The spreader 133 spreads the interleaved signal, with a spreading code having a spreading factor of at least one. The spreading factor of the spreading code used here, and the modulation scheme set by the modulator 134 at a subsequent stage, give influences to the SN gain of the spread signal on the OFDM receiver R0 side. For this reason, the spreading code used here is properly determined by the scheduling unit 110, in accordance with the channel quality information, the geometric location and the signal importance of the OFDM receiver R0.

The modulator 134 modulates the spreading result of the spreader 133 in the modulation scheme designated by the scheduling unit 110, and generates a data signal represented as a complex number value.

On the basis of the information output from the scheduling unit 110, the control signal generating unit 140 generates the kind of a scrambling code, signal location information representing frequency locations of subcarriers to which the data signals and pilot signals are allocated, spreading code information, interleaving pattern information and channel encoding information, etc. as physical layer control information required for the OFDM receiver R0 to receive the signal transmitted from the OFDM transmitter T0.

Then, the control signal generating unit 140 directly modulates the physical layer control information as a transmit signal, and outputs the modulation result to the multiplier 150a. In the subcarrier allocating unit 160, channel allocation is executed. The generated physical layer control information may be output to the data signal generating unit 130 such that the information is put on the transmit data as an upper layer signal.

The multiplier 150a multiplies the control signal generated by the control signal generating unit 140 by the scrambling code and then spreads the multiplied signal. The scrambling code used here is pseudo-orthogonal to the scrambling code used in the OFDM transmitters T1, T2.

The multiplier 150b multiplies the pilot signal generated by the pilot signal generating unit 120 by the scrambling code and spreads the multiplied signal. The scrambling code used here is pseudo-orthogonal to the scrambling code used in the OFDM transmitters T1, T2.

The multiplier 150c multiplies the data signal generated by the data signal generating unit 130 by the scrambling code and spreads the multiplied signal. The scrambling code used here is pseudo-orthogonal to the scrambling code used in the OFDM transmitters T1, T2.

The scrambling codes used in the multipliers 150a, 150b, 150c may be the same. The spreading codes used in the spreaders 121, 133 may be the same.

In accordance with the instruction from the scheduling unit 110, the subcarrier allocating unit 160 conducts the processing of allocating the pilot signal spread by the multiplier 150b and the data signal spread by the multiplier 150c, to the subcarriers of the general chunk A2 or the high-density chunk A1. Index information representing the allocation of this processing, the data signal and the pilot signal are output to the IFFT unit 170. The control signal spread by the multiplier 150a is allocated to the subcarriers of the control channel and transmitted, prior to the chunk allocation.

On the basis of the index information input from the data signal generating unit 130, the IFFT unit 170 conducts the OFDM modulation for the control signal, the pilot signal and the data signal which are allocated to the chunks by the subcarrier allocating unit 160 and thereby generates an OFDM signal as a sequence of a plurality of OFDM symbols. In other words, the IFFT unit 170 generates an OFDM signal by converting the signal of the frequency area into the signal of the time area.

The GI adder 180 adds a guard interval (GI) to the OFDM signal generated by the IFFT unit 170.

The radio transmission unit 190 comprises a DA converter, an up-converter and a power amplifier. By employing them, the radio transmission unit 190 converts the OFDM signal to which the guard interval is added into a radio (RF) signal and transmits the signal from the antenna 190a.

Next, a configuration of an OFDM receiver according to the embodiment of the present invention is described with reference to FIG. 4. The OFDM receiver shown in FIG. 4 corresponds to the OFDM receivers R0, R1, R2 shown in FIG. 1. The following descriptions are focused on, for example, the OFDM receiver R0 receiving a signal from the OFDM transmitter T0.

Figure 4:
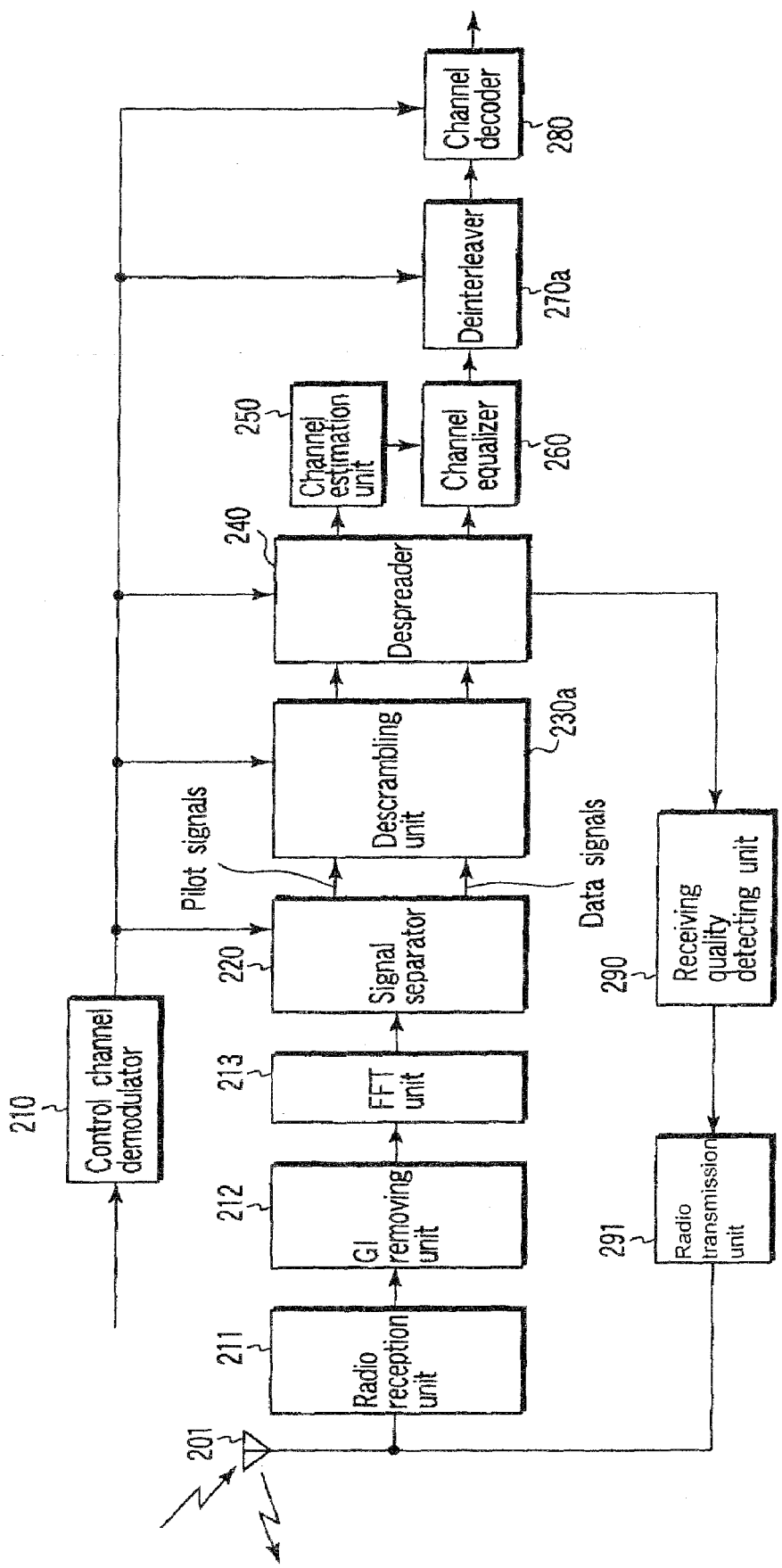
FIG. 4 is a block diagram showing a configuration of an OFDM receiver in the OFDM radio communications system shown in FIG. 1.

The OFDM receiver R0 comprises an antenna 201, a control channel demodulator 210, a radio reception unit 211, a GI removing unit 212, an FFT unit 213, a signal separator 220, a descrambling unit 230a, a despreader 240, a channel estimation unit 250, 1a channel equalizer 260, a deinterleaver 270a, a channel decoder 280, a receiving quality detecting unit 290, and a radio transmission unit 291 as shown in FIG. 4.

The antenna 201 receives from space RF signals transmitted from the respective OFDM transmitters T0, T1, T2. The radio reception unit 211 comprises a low-noise amplifier, a down-converter and an AD converter and allows them to convert the RF signals into baseband digital signals.

The GI removing unit 212 removes a guard interval from the baseband digital signals. The FFT (fast Fourier transform) unit 213 converts time-area signals into frequency-area signals, in the guard interval-removed baseband digital signals, by the fast Fourier transform.

The control channel demodulator 210 preliminarily demodulates the control signal received from the OFDM transmitter T0 over the control channel. Then, the control channel demodulator 210 obtains signal location information representing the kind of scrambling codes, frequency locations of subcarriers to which the data signals and the pilot signals are allocated, spreading code information, and resource information relating to the resource allocation such as interleaving pattern information, channel coding information, etc. These resource information items are output to the blocks which need the resource information items.

The signal separator 220 separates the signals allocated to each of the subcarriers into the pilot signal and the data signal, on the basis of the signal location information obtained by the control channel demodulator 210. The pilot signal and the data signal thus separated are output to the descrambling unit 230a.

The signal separator 220 detects the frequency band of the subcarrier to be received, on the basis of the signal location information obtained by the control channel demodulator 210, discriminates in what format the chunk including the subcarrier to be received is, on the basis of the detection result, and separates the signal allocated to the subcarrier to be received into the pilot signal and the data signal on the basis of the discrimination result. The pilot signal and the data signal thus separated are output to the descrambling unit 230a.

The descrambling unit 230a obtains an inverse descrambling pattern to the scrambling pattern used in the OFDM transmitter T0, on the basis of the kind of the scrambling code obtained by the control channel demodulator 210, and descrambles the pilot signal and the data signal in the descrambling pattern. The pilot signal and the data signal thus descrambled are output to the despreader 240.

The despreader 240 despreads the descrambled pilot signal and data signal, with the spreading code based on the spreading code information obtained by the control channel demodulator 210. The despreader 240 outputs the despreading result of the pilot signal, of the despreading result thus obtained, to the channel estimation unit 250 and outputs the despreading result of the data signal to the channel equalizer 260.

The channel estimation unit 250 conducts the channel estimation for the subcarrier to which the data signal is allocated, by conducting the averaging or interpolation using the despread pilot signal. The channel estimation unit 250 thereby obtains a channel estimation representing the channel response.

The channel equalizer 260 conducts channel equalization for the despread data signal, with the channel estimation obtained by the channel estimation unit 250. The data signal subjected to the channel equalization is output to the deinterleaver 270a.

The deinterleaver 270a deinterleaves the data signal subjected to the channel equalization, on the basis of the interleaving pattern information obtained by the control channel demodulator 210. The data signal thus interleaved is output to the channel decoder 280.

The channel decoder 280 conducts the channel decoding for the deinterleaved signal, on the basis of the channel coding information obtained by the control channel demodulator 210. The bit sequence which is an original of the data signal is thereby reproduced.

The receiving quality detecting unit 290 detects the receiving quality and interference signal intensity in each frequency band of the signal received from the OFDM transmitter, on the basis of the despreading result of the pilot signal obtained by the despreader 240, and outputs the detection result to the radio transmission unit 291 as the channel quality information. Then, the channel quality information is transmitted to the corresponding OFDM transmitter.

Next, operations of the OFDM radio communications system having the above-described configuration are described. In the OFDM radio communications system, communications are conducted between the OFDM transmitter T0 and the OFDM receiver R0, between the OFDM transmitter T1 and the OFDM receiver R1, and between the OFDM transmitter T2 and the OFDM receiver R2. The following descriptions are focused on the communications between the OFDM transmitter T0 and the OFDM receiver R0.

First, the OFDM receivers R0, R1, R2 detect the information of the receiving quality and interference signal intensity in each frequency band, in relation to the signals received from the respective OFDM transmitters T0, T1, T2 and transmit the information as channel quality information to the OFDM transmitters T0, T1, T2, respectively.

In the OFDM transmitter T0, the channel quality information transmitted from the OFDM receiver R0 is received and input to the scheduling unit 110. The scheduling unit 110 conducts the resource allocation corresponding to the channel quality information, for the channel encoder 131, the spreader 133, the modulator 134 and the subcarrier allocating unit 160.

The resource information thus allocated to the OFDM receiver R0 is input to the control signal generating unit 140. The resource information is used for generation of the control signal including the physical layer control information required for the OFDM receiver R0 to receive the signal transmitted from the OFDM transmitter T0.

For example, if the OFDM receiver R0 receives the channel quality information indicating poor receiving quality for the reason that the OFDM receiver R0 is located on the boundary between the cell formed by the OFDM transmitter T0 and the cell formed by the OFDM transmitter T1 or T2 and thereby receives great interference of the OFDM transmitter T1 or T2, the scheduling unit 110 orders the spreader 133 to spread the data at a high spreading factor in order to enhance the SNR of the receive signal, or orders the channel encoder 131 to conduct the channel coding at a low rate or the modulator 134 to select the low-rate modulation scheme in order to reduce the receive error rate, on the basis of the resource allocation.

Thus, if the interference from the OFDM transmitter T1 or T2 is great and the receiving quality is therefore poor, the scheduling unit 110 orders the subcarrier allocating unit 160 to conduct the subcarrier allocation so as to allocate the high-density chunk A1 to the OFDM receiver R0.

The subcarrier allocating unit 160 thereby allocates the control signal spread by the multiplier 150a, the pilot signal spread by the multiplier 150b, and the data signal spread by the multiplier 150c, all generated for the OFDM receiver R0, to the subcarriers of the high-density chunk A1.

If the interference from the OFDM transmitter T1 or T2 is small and the receiving quality is good, the scheduling unit 110 orders the subcarrier allocating unit 160 to conduct the subcarrier allocation so as to allocate the general chunk A2 to the OFDM receiver R0.

The subcarrier allocating unit 160 thereby allocates the control signal spread by the multiplier 150a, the pilot signal spread by the multiplier 150b, and the data signal spread by the multiplier 150c, all generated for the OFDM receiver R0, to the subcarriers of the general chunk A2.

The control signal, the pilot signal and the data signal thus subjected to the chunk allocation by the subcarrier allocating unit 160 are subjected to the OFDM modulation by the IFFT unit 170 and converted into the OFDM signal. After the guard interval is added to the OFDM signal by the GI adder 180, the OFDM signal is transmitted to the OFDM receiver R0 via the radio transmission unit 190 and the antenna 190a.

On the other hand, the reception is conducted in the OFDM receiver R0 in the following manner.

First, the control channel demodulator 210 demodulates the signal which is preliminarily received from the OFDM transmitter T0 over the control channel and obtains the resource information such as the kind of the scrambling code, signal location information indicating the subcarrier allocation of the data signals and the pilot signals in the subcarriers, spreading code information, interleaving pattern information and channel coding information. These resource information items are output to blocks which need the information items, respectively.

The RF signal received by the antenna signal 201 is converted into the baseband digital signal by the radio reception unit 211. After the guard interval is removed from the baseband digital signal by the GI removing unit 212, the time-area signal is converted by the FFT unit 213 into the frequency-area signal, which is thereby divided into signals of the respective subcarriers. The output signals of the FFT unit 213 are input to the signal separator 220.

The signal separator 220 is notified of the resource information (signal location information) obtained by the control channel demodulator 210, and therefore recognizes which frequency band is employed to transmit the signal for the OFDM receiver R0. When the signal separator 220 recognizes the frequency band in this manner, the signal separator 220 discriminates whether the chunk allocated to the OFDM receiver R0 is the high-density chunk such as the chunk A1 shown in FIG. 3A or the general chunk such as the chunk A2. Since the high-density chunk and the general chunk are set in the frequency band which is preliminarily determined commonly among the OFDM transmitters T0, T1 and T2, the signal separator 220 can discriminate the kind of the chunk by recognizing the frequency band.

On the basis of the format of the recognized kind, the signal separator 220 separates the chunk to be received, of the output signals of the FFT unit 213, into the pilot signal and the data signal.

The pilot signal and data signal thus separated are descrambled by the descrambling unit 230a, in the descrambling pattern which is opposite to the scrambling pattern employed by the OFDM transmitter T0, on the basis of the kind of the scrambling code obtained by the control channel demodulator 210.

The descrambled pilot signal and data signal are subjected to despreading in the despreader 240, by using the spreading code based on the spreading code information obtained by the control channel demodulator 210, i.e. the spreading code used by the OFDM transmitter T0.

The despread pilot signal is input to the channel estimation unit 250, subjected to averaging and interpolation, and used for the channel estimation of the subcarrier to which the data signal is allocated. The channel estimation representing the channel response is thereby obtained. On the other hand, the data signal is input to the channel equalizer 260. The channel equalizer 260 conducts the channel equalization of the data signal, by using the channel estimation obtained by the channel estimation unit 250.

The data signal thus subjected to the data equalization is deinterleaved by the deinterleaver 270a and subjected to channel decoding by the channel decoder 280, and the bit string which is the original of the data signal is thereby regenerated.

In the OFDM radio communications system having the above-described configuration, the general chunk to which the pilot signals are allocated at the general rate and the high-density chunk to which the pilot signals are allocated at a higher rate than the general chunk, are transmitted in the frequency band common to the OFDM transmitters T0, T1, T2. Each of the OFDM transmitters T0, T1, T2 allocates the high-density chunk to the OFDM receiver which makes notification of a poor receiving quality.

By conducting the reception through the high-density chunk, in each of the OFDM transmitters T0, T1, T2, more pilot signal energy at the channel estimation can be collected as compared with the reception through the general chunk. The SN gain of the transmission path estimation is therefore enhanced. In addition, the SN gain of the transmission path estimation is further enhanced by using the orthogonal sequence for the spreading of the pilot signal.

For example, if the OFDM receiver R0 is located on the boundary between the cell formed by the OFDM transmitter T0 and the cell formed by the other OFDM transmitter T1 or T2 and receives the channel quality information indicating a great interference from the OFDM transmitter T1 or T2 and a poor receiving quality, the OFDM transmitter T0 allocates the high-density chunk to the OFDM receiver R0. Therefore, even if the OFDM receiver R0 is located on the boundary, the receiving quality can be enhanced.

In general, there is offset of the transmission power between the pilot signal and the data signal. For this reason, if the pilot signal transmitted from the other OFDM transmitter is present in the subcarrier of the same frequency and the same time as the data signal transmitted from the desired OFDM transmitter, a greater interference than the interference occurring between the data signals is caused.

In the above-described OFDM radio communications system, however, since the general chunk and the high-density chunk are used distinctively from each other, for the frequency determined commonly in the OFDM transmitters T0, T1, T2, the pilot signals and the data signals of the different OFDM transmitters do not put in the subcarrier of the same frequency and the same time.

For this reason, according to the above-described OFDM radio communications system, the accuracy in the channel estimation and the data receiving accuracy can be enhanced.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, in the OFDM transmitter T0 shown in FIG. 2, the interleaver 132a conducts interleaving common to the OFDM transmitters T0, T1, T2, for the encoding result of the channel encoder 131. However, the OFDM transmitter T0 is not limited to this structure. For example, an interleaver 132b is provided instead of the interleaver 132a and the multiplier 150c is removed as shown in FIG. 5.

The interleaver 132b conducts interleaving inherent to the OFDM transmitter T0, for the encoding result of the channel encoder 131 to make the data signal have the orthogonality to the other OFDM transmitters T1 and T2. The scheduling unit 110 outputs the inherent interleaving pattern information to the subcarrier allocating unit 160 to notify the OFDM receiver R0 of the information.

Figure 6:
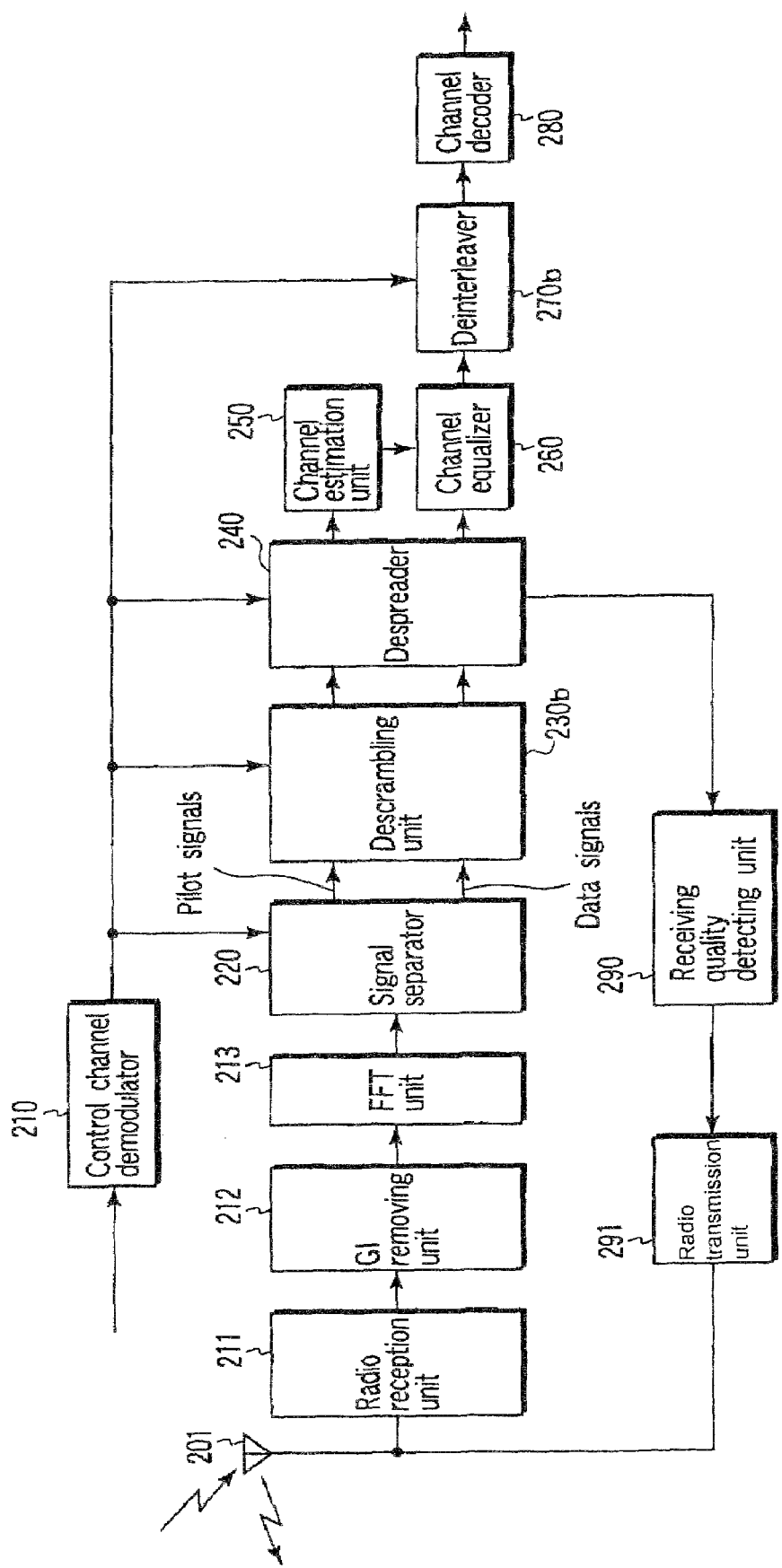
FIG. 6 is a block diagram showing a configuration of an OFDM receiver corresponding to the OFDM transmitter shown in FIG. 5.

To respond to this, the OFDM receiver R0 has a configuration shown in FIG. 6. A descrambling unit 230b is provided instead of the descrambling unit 230a of the OFDM receiver R0 shown in FIG. 4 to descramble the pilot signal alone. A deinterleaver 270b provided instead of the deinterleaver 270a conducts deinterleaving corresponding to the interleaver 132b of the OFDM transmitter T0. Even in this configuration, the orthogonality to the other OFDM transmitters T1 and T2 can be given to the data signal.

Figure 7:
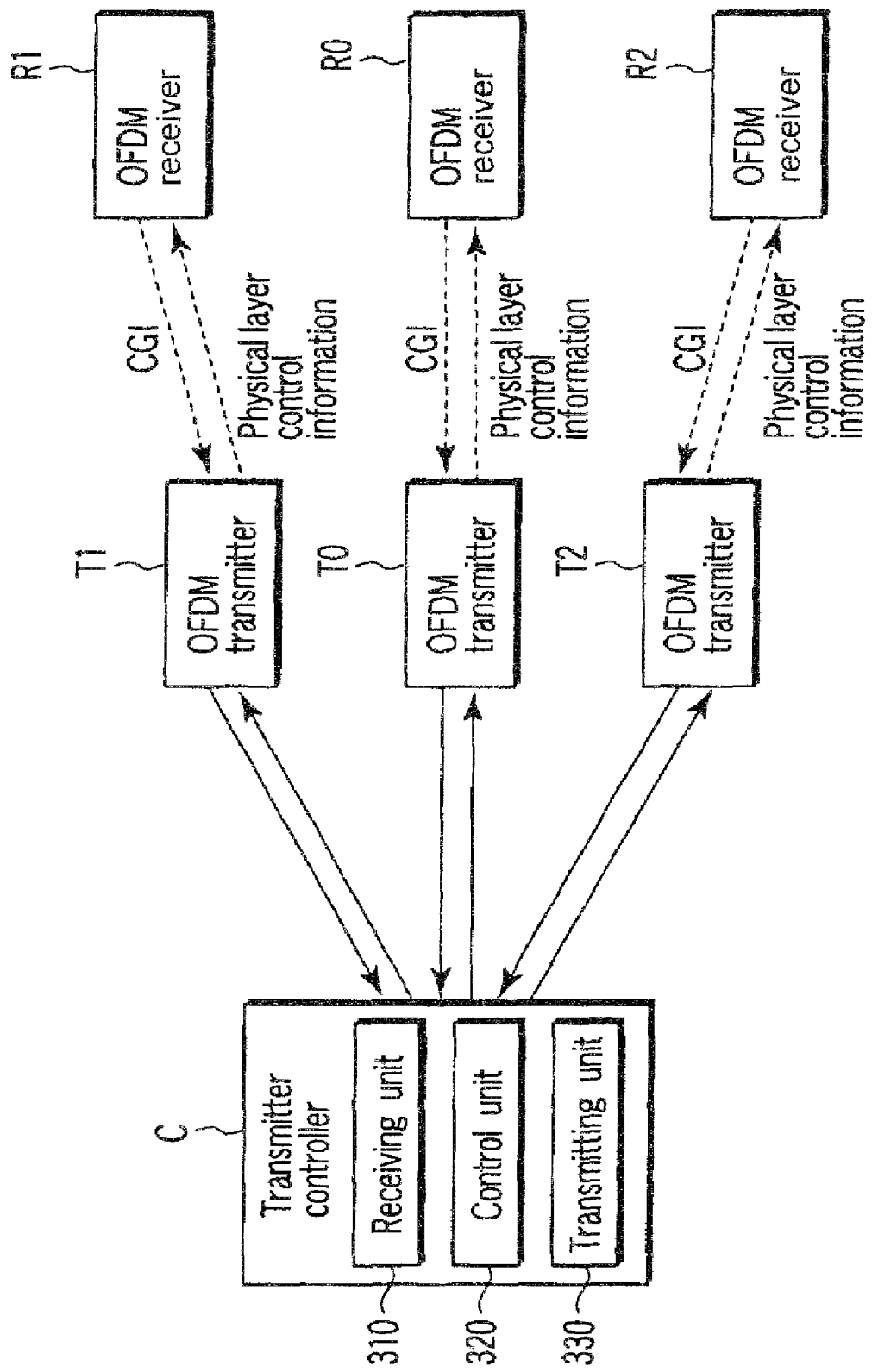
FIG. 7 is an illustration showing operations of a modified example of the OFDM radio communications system shown in FIG. 1.

In addition, in the above-described embodiment, the frequency bands of the general chunk and the high-density chunk are fixed, and the OFDM transmitters T0, T1, T2 autonomously conduct the allocation of the general chunk and the high-density chunk on the basis of the channel quality information which the OFDM receivers R0, R1, R2 making communications with the OFDM transmitters T0, T1, T2, respectively, transmit to the OFDM transmitters T0, T1, T2. However, the allocation is not limited to this. For example, the OFDM transmitters T0, T1, T2 conducts the chunk allocation for the OFDM receivers R0, R1, R2 in accordance with an instruction of a transmitter controller C, as shown in FIG. 7.

First, the OFDM transmitters T0, T1, T2 receive the channel quality information which the OFDM receivers R0, R1, R2 making communications with the OFDM transmitters T0, T1, T2, respectively, transmit to the OFDM transmitters T0, T1, T2. On the basis of the channel quality information, the scheduling unit 110 determines which of the general chunk and the high-density chunk should be allocated to the OFDM receiver with which the own transmitter makes communications, and obtains the rate of the OFDM receivers to which the high-density chunk should be allocated, on the basis of the determination. This rate is transmitted to the transmitter controller C as rate information, by the subcarrier allocating unit 160, the IFFT unit 170, the GI adder 180 and the radio transmission unit 190.

To maximize the throughput, a receiving unit 310 of the transmitter controller C receives the rate information transmitted from the OFDM transmitters T0, T1, T2, a control unit 320 thereof determines the general frequency band to which the general chunk is applied and the high-density frequency band to which the high-density chunk is applied, on the basis of the rate information, and a transmitting unit 330 thereof transmits band information representing the determined band allocation to the OFDM transmitters T0, T1, T2, as common band allocation information.

The OFDM transmitters T0, T1, T2 receive the band information transmitted from the transmitter controller C, and conducts transmission by allocating the general chunk to the general frequency band and conducts transmission by allocating the high-density chunk to the high-density frequency band on the basis of the band information. Prior to this transmission, the OFDM transmitters T0, T1, T2 notify the OFDM receivers R0, R1, R2 of the frequency bands to be received and the kind of the chunks, through the physical layer control information.

In other words, the transmitter controller C dynamically changes the frequency bands in which the general chunk and the high-density chunk are allocated, on the basis of the rate information transmitted from the OFDM transmitters T0, T1, T2. Therefore, the throughput can be maximized by taking advantage of the limited resources.

It is needless to say that the present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An OFDM radio communications system comprising:
a plurality of transmitters that are connected to a controller and that transmit OFDM signals including as a chunk a plurality of subcarriers to which pilot signals and data signals are allocated, and
a plurality of receivers receiving the OFDM signals in frequency bands designated by the transmitters,
wherein each of the plurality of receivers comprises:
quality detecting means for detecting receiving quality of the OFDM signals received from the transmitters; and
transmission means for transmitting channel quality information indicating the receiving quality detected by the quality detecting means,
wherein each of the plurality of transmitters comprises:
first reception means for receiving the channel quality information from the plurality of receivers;
determination means for determining which of a general chunk having the pilot signals allocated at a general rate, and a high-density chunk having the pilot signals allocated at a higher rate than the rate of the general chunk, should be allocated to each of the plurality of receivers, in accordance with the channel quality information received by the first reception means;
rate detecting means for obtaining a rate of allocation of the general chunk and the high-density chunk, in accordance with the chunk allocation determined by the determination means; and
rate information transmitting means for transmitting the rate obtained by the rate detecting means to the controller as rate information,
wherein the controller comprises:
reception means for receiving the rate information;
band determining means for determining a general frequency band to which the general chunk is allocated and a high-density frequency band to which the high-density chunk is allocated, in accordance with the rate information received by the reception means; and
transmission means for transmitting band information indicating the frequency bands determined by the band determining means to the plurality of transmitters,
wherein each of the plurality of transmitters further comprises:
second reception means for receiving the band information;
allocation means for allocating the general chunk to the general frequency band and the high-density chunk to the high-density frequency band, in accordance with the band information received by the second reception means;
first transmission means for transmitting control information indicating the frequency bands with which the OFDM signals are to be transmitted to the respective receivers, to the plurality of receivers, in accordance with the frequency bands allocated by the allocation means; and
second transmission means for allocating the pilot signals and the data signals to the general chunk and the high-density chunk allocated by the allocation means, and transmitting the general chunk or the high-density chunk to the receivers, and
wherein each of the plurality of receivers further comprises:
first reception means for receiving the control information; and
second reception means for receiving the chunk in the frequency band based on the control information received by the first reception means.

2. A transmitter for transmitting to a plurality of receivers OFDM signals including as a chunk a plurality of subcarriers to which pilot signals and data signals are allocated, the transmitter comprising:
reception means for receiving channel quality information from the plurality of receivers;
determination means for determining which of a general chunk having the pilot signals allocated at a general rate, and a high-density chunk having the pilot signals allocated at a higher rate than the rate of the general chunk, should be allocated to each of the plurality of receivers, in accordance with the channel quality information received by the reception means;
allocation means for allocating the general chunk to a general frequency band common to other transmitters and the high-density chunk to a high-density frequency band, in accordance with the chunk allocation determined by the determination means;
first transmission means for transmitting control information indicating the frequency bands with which the OFDM signals are to be transmitted to the respective receivers, to the plurality of receivers, in accordance with the frequency bands allocated by the allocation means; and
second transmission means for allocating the pilot signals and the data signals to the general chunk and the high-density chunk allocated by the allocation means, and transmitting the general chunk or the high-density chunk to the receivers.

3. A transmitter that is connected to a controller and that transmits to a plurality of receivers OFDM signals including as a chunk a plurality of subcarriers to which pilot signals and data signals are allocated, the transmitter comprising:

first reception means for receiving channel quality information from the plurality of receivers;

determination means for determining which of a general chunk having the pilot signals allocated at a general rate, and a high-density chunk having the pilot signals allocated at a higher rate than the rate of the general chunk, should be allocated to each of the plurality of receivers, in accordance with the channel quality information received by the first reception means;

rate detecting means for obtaining a rate of allocation of the general chunk and the high-density chunk, in accordance with the chunk allocation determined by the determination means;

rate information transmitting means for transmitting the rate obtained by the rate detecting means to the controller as rate information;

second reception means for receiving band information indicating a general frequency band to which the general chunk is allocated and a high-density frequency band to which the high-density chunk is allocated, as determined based on the rate information by the controller;

allocation means for allocating the general chunk to the general frequency band and the high-density chunk to the high-density frequency band, in accordance with the band information received by the second reception means;

first transmission means for transmitting control information indicating a kind of the chunks and the frequency bands with which the OFDM signals are to be transmitted to the respective receivers, to the plurality of receivers, in accordance with the frequency bands allocated by the allocation means; and second transmission means for allocating the pilot signals and the data signals to the general chunk and the high-density chunk allocated by the allocation means, and transmitting the general chunk or the high-density chunk to the receivers.

4. The transmitter according to claim 2, further comprising spreading means for spreading the data signal at a scrambling code preliminarily allocated inherently to the transmitter, wherein the second transmission means allocates the data signal spread by the spreading means and the pilot signal to the general chunk and the high-density chunk allocated by the allocation means, and transmits the chunks to the receivers.

* * * * *